Dec. 28, 1948.
C. M. RIFENBERGH
2,457,727
ELECTRICAL MEASURING SYSTEM
Filed Sept. 27, 1940
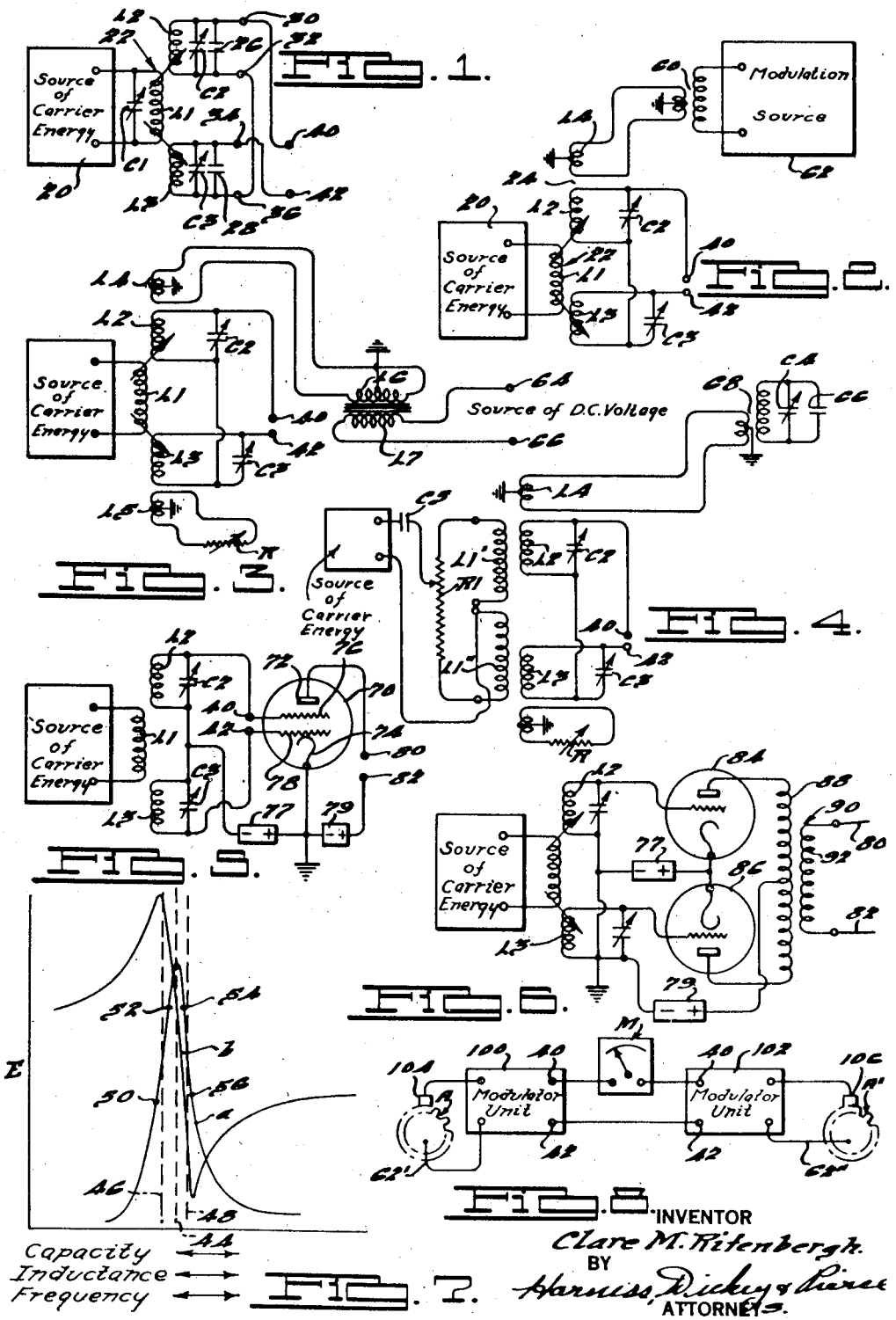
INVENTOR
Clare M. Rifenbergh.
BY
Harness, Dickey & Pierce
ATTORNEYS Patented Dec. 28, 1948

2,457,727

UNITED STATES PATENT OFFICE 2,457,727

ELECTRICAL MEASURING SYSTEM

Clare M. Rifenbergh, Grosse Pointe, Mich., assignor to Armour Research Foundation of Illinois Institute of Technology, Chicago, Ill., a not-for-profit corporation of Illinois Application September 27, 1940, Serial No. 358,742

11 Claims. (Cl. 73—432)

The present invention relates to systems of electrical measurement, and in particular is directed to the provision of an improved differential modulator system characterized as being operative to produce an indication or signal, which is accurately proportional to a physical change or disturbance, which it is desired to measure or reflect, as well as to the provision of improved mechanical arrangements and devices for directly responding to such a change or disturbance.

It has long been recognized that a desirable means of measuring extremely small changes in physical characteristics, such for example, as changes in size, weight, temperature, and relative disposition, occurring either rapidly or slowly, is to arrange a mechanism in such a manner that the change in characteristic, which it is desired to measure, produces or controls the production of an electrical voltage or current, which voltage or current is susceptible of measurement either directly or after being suitably amplified.

Common types of such measuring systems are those wherein the change in physical characteristic is utilized to modulate the flow of current in, or the voltage across, a part of an electric circuit. In such systems, a source of alternating current is commonly provided which delivers energy to a second circuit through a transformer, the secondary winding whereof is electrically connected either to an amplifier circuit or directly to a measuring instrument. It is customary in such systems to tune the secondary circuit to a point in the neighborhood of resonance to the alternating current source. The change which it is desired to measure is caused to alter the magnitude of reactive components of the secondary circuit, thus causing the secondary circuit to more closely approach or depart further from the condition of resonance, thereby altering both the voltage and the current conditions at the instrument.

Systems of the above generally indicated character, with which the present applicant is aware, are subject to the serious limitations, among others, that the magnitude of the change which can be indicated or measured is necessarily only a small fraction of the main voltage or current applied to or passed through the indicating or measuring instrument. Stated in another way, the voltage or current applied to or transmitted through the instrument in the absence of the change to be measured may be regarded as a carrier voltage or current, while the change it is desired to measure may be regarded as the modulation of such carrier voltage or current. It will be recognized that the portions of a so-called resonance curve within which the physical change must occur are relatively limited by circuit characteristics, and for this reason, in the prior systems the modulation current or voltage can bear only a small ratio to the carrier current or voltage.

With the foregoing general considerations in view, the principal objects of the present invention are to provide a system comprising differentially related modulator elements, so related as to produce an electrical quantity which is directly proportional to the actual degree of modulation or is a controllable percentage of the carrier wave, instead of reflecting or measuring a carrier value plus or minus such modulation and which is stably responsive to extremely small modulation values; to provide such a system embodying differentially connected circuits having inductively, capacitively or conductively coupled portions, so that a change or modulation of voltage or current in one of the circuits is accompanied by a change or modulation in the other of the circuits; to provide such a system wherein change or modulation in one of the circuits can be produced by altering an electrical characteristic of an element directly connected thereto, or by altering the characteristic of an element inductively or capacitively coupled thereto.

Further objects of the present invention are to provide improved arrangements for measuring changes or magnitudes, including, but not by way of limitation, torque, temperature, pressure, humidity, strain, and the like.

With the above as well as other objects in view, which appear in the following description and in the appended claims, preferred but illustrative embodiments of the invention are shown in the accompanying drawings, throughout the several views of which corresponding reference characters are used to designate corresponding parts and in which:

Figures 1 through 6, respectively, are diagrammatic views of illustrative circuits embodying the invention;

Fig. 7 is a diagrammatic view illustrative of resonance conditions in an electrical circuit;

Fig. 8 is a diagrammatic view of a further embodiment of the invention.

Referring first to Fig. 1, the basic system comprises generally a source 20 of carrier energy, which may be of any siutable type adapted to deliver alternating current of suitable frequency. The system admits of the use of a wide range of frequencies, it being preferred that the carrier frequency, of the source 20, be several times that of the maximum modulation frequency expected, and it being further understood that the system is more sensitive at the higher carrier frequencies. A carrier frequency of from three to four hundred kilocycles is satisfactory for a wide range of applications. The output terminals of the source 20 are directly connected to the primary winding L1 of a transformer 22, having two secondary windings L2 and L3, both whereof are inductively coupled to the primary winding and which may or may not be directly inductively coupled to each other through a common magnetic circuit. It will be understood that the just-mentioned magnetic coupling may be made through either an air or other core, depending upon the frequency of the source 20. If desired, a tuning condenser C1 may be connected in parallel with the primary winding L1 to tune the primary circuit to a value approaching resonance to the source 20.

The secondary winding L2 has connected in parallel therewith a pair of condensers C2 and 26 and a corresponding pair of condensers C3 and 28 are connected directly in parallel with the secondary winding L3, it being understood, of course, that condensers C2 and 26, and condensers C3 and 28, respectively, may, if desired, be combined into a single unit. As shown, condensers C2 and C3 may be regarded as modulating condensers and condensers 26 and 28 may be regarded as tuning condensers. The terminals 30 and 32 of the circuit, including the winding L2, and the output terminals 34 and 36 of the circuit, including the winding L3, are differentially connected to each other and to a pair of terminals 40 and 42. It will be appreciated that any suitable measuring or indicating device, or other instrument, which it is desired to actuate by means of the hereinafter described modulation, may be connected to the terminals 40 and 42 either directly or through suitable amplifying mechanism. It will further be understood that the just-mentioned instrument or device may include any of a variety of indicating, measuring, or other devices, and throughout the following description and in the appended claims the terms "instrument" and "device" are used in a generic sense.

It will be appreciated that the voltage appearing between the terminals 40—42 is the vectorial sum of the voltage components between the terminals 30—32 and 34—36. Thus, the circuit of Fig. 1 may be initially adjusted to cause these components to either partially or entirely balance each other, thus developing between the terminals 40—42 a voltage, which under normal conditions, is any desired finite percentage of the so-called carrier voltage, or is of substantially zero value. Various considerations, such as the nature of the application and the character of the measuring or indicating apparatus determine whether the normal or initial balance should be partial or entire, and throughout the following description, the term "predetermined normal balance" is used in a generic sense as comprehending either a partial or an entire such balance. The arrangements of the present invention are of particular value in that they afford an extremely reliable means of obtaining a precise desired initial balance, whether partial or entire.

It will be appreciated that if the voltage or voltages across either or both of the two differentially connected circuit portions is or are altered, as to phase or amplitude or both, a voltage will appear across the terminals 40—42, of the frequency of the source 20, and having an amplitude equal to the vectorial sum of the two component voltages. In accordance with the present invention, these changes in voltage of one or both of said components are effected by altering the impedance of one or both of said circuit portion, and a particular feature of the invention resides in so coupling the portions that a change in one portion is accompanied by a change in the other, the changes differing either in direction or magnitude or both. The effect of impedance changes upon the voltage components is illustrated by the characteristic curves of Fig. 7, in which the resonance curve $a$ represents values of voltage across a circuit corresponding to differing values of reactance of the circuit, and in which the curve $b$ represents corresponding phase relations of the circuit. It will be recognized that changes in the adjustment of a circuit effect amplitude changes in the relation indicated by the curve $a$ and effect phase changes in the relation indicated in curve $b$. Also, that when two such circuits are differentially connected, changes either as to phase or amplitude produce a change in the vectorial sum of the voltages of said circuits. Consequently, in the present claims and description, the term "voltage change" is used to comprehend effects due to both amplitude and phase changes.

It will be noticed that the ordinate 44 corresponds to the so-called resonance peak of Fig. 7, while the ordinates 46 and 48 correspond to points at respectively opposite sides of the resonance peak. It will also be noted that the resonance curve is substantially linear throughout a range at either side of the ordinate 46, and throughout a range at either side of the ordinate 48, the first such linear portion falling between the reference characters 50 and 52, and the other such linear portion falling between points 54 and 56. Also, the curve $b$ is substantially linear throughout a substantial range. It will be appreciated that the factors of frequency, capacity, inductance and resistance of the associated circuit are determinative of the form, including the relative lengths and steepness of the linear portions, of the resonance curve $a$, and that any change in impedance of the associated circuit alters the voltage across such circuit, any change in reactance being further accompanied by a change in the tuning thereof along the resonance curve $a$. It will also be appreciated that if the associated circuit is tuned to a point at one side of the resonance curve, a change in frequency, capacity, inductance, or resistance, which produces an increase in voltage will, if the circuit is tuned to a point at the other side of the resonance curve, produce a decrease in voltage.

Referring again to Fig. 1, it is preferred to adjust the circuits, including the winding L2 and condensers C2 and 26, and winding L3 and condensers C3 and 28, to points falling within one or the other of the linear portions of the curve $a$ of Fig. 7. The adjustment points, along such linear portions depend, of course, upon the direction and magnitude of the change which it is desired to measure, and the system is preferably so proportioned that the adjustments remain within the linear portions throughout the entire change. These adjustments are preferably made by varying either/or both capacitive and inductive components of the network, it being noted that variations in the inductive coupling between the windings L1 and L2 and L1 and L3 appear particularly effective in bringing the component voltages into the desired degree of amplitude balance, whereas adjustments in the tuned secondary circuits appear particularly effective in bringing the voltage components into the desired degree of phase balance.

In Fig. 1, the coupling between the two circuit portions is inductive and the modulation is specifically introduced by varying the value of one or both of condensers C2 and C3. It is preferred to effect the variation or modulation by altering the value of only one of such condensers, and suitable variable condenser elements are shown in certain of the later described figures.

Accordingly, in the operation of the system of Fig. 1, a modulating change in value of condenser C2, for example, alters the voltage across the terminals 30—32 and also effects a change in the voltage across the terminals 34—36, the relative values and directions of the two changes being determined both by the magnitude and direction of the modulating change, by the tuning of the individual circuit portions, and by the coupling between the several windings. The amplitude of the resultant voltage between the terminals 40—42 is thus the vectorial sum of the just-mentioned two voltage changes and this resultant voltage also is proportional to the change or modulation which produced it, as distinguished from representing only a relatively small percentage of a carrier voltage initially impressed across the terminals 40—42. Moreover, as soon as the physical change which altered the value of the condenser C2 or C3, as the case may be, is removed, and such condenser or condensers are restored to their original values, the voltage between the terminals 40—42 resumes its original normal value.

It will further be appreciated that changes in the value, for example, of condenser C2 or C3, as the case may be, are reflected substantially instantaneously as corresponding voltages between the terminals 40—42. Thus, any relation, variable or otherwise, that may obtain between the changes in value of condenser C2 and any other factor such as time, position, or the like are correspondingly reflected across the terminals 40—42, and for changes occurring from zero frequency up to the previously mentioned ratio to the carrier frequency, the voltage wave across the terminals 40—42 remains at the basic carrier frequency, and the amplitude of such wave is accurately proportional to and in time phase with such changes. The system thus produces a wave form which accurately and stably reproduces the pattern of the modulating changes. In practice, modulating changes of the order of thousandths of a micro-microfarad are accurately indicated.

In the just-described system, the change or modulation is produced by altering the value of an inductive or capacitive element directly connected to one of the secondary circuits. In the modified arrangement of Fig. 2, this modulation or change is produced by an element which is inductively coupled to the modulator network, in this case, to at least one of the two secondary circuits, and which alters the voltages across said circuits. Referring particularly to Fig. 2, the transformer 22 is supplied with alternating current energy from a souce 20, and, as before, is provided with secondary windings L2 and L3, the output terminals of the circuits whereof are differentially connected together and are connected to the terminals 40—42, between which the measuring or indicating device may be connected. As before, the secondary circuits are tuned by means of condensers C2 and C3 to desired points, so that under normal conditions a predetermined voltage, finite or substatnially zero, is impresed across the terminals 40—42.

In the instance now being described, the modulation or change is introduced by means of an additional winding L4, which is inductively coupled to the winding L2 and may or may not be inductively coupled to windings L1 and L3, except through winding L2. The winding L4, in turn, is supplied by a transformer 60, which, in turn, derives energy from a source indicated generally at 62. It will be understood that the change which it is desired to measure is produced by altering a characteristic of the output of the source 62, which change is reflected as a change in the voltage or current in the winding L4. The latter change, in turn, is reflected as a voltage between the terminals 40—42, which change, as before, is directly proportional to the magnitude of the change or modulation which produced it.

In the further modified arrangement of Fig. 3, the circuit connections are much the same as those in Fig. 2, with the exception that in this instance the modulation of the winding L4 is produced by altering a characteristic of a direct current source connected between the terminals 64—66 and which acts to modify the flux within a coil L6, which is inductively coupled to the winding L7. In this instance, also, an additional circuit comprising the winding L5 and a variable resistor R is inductively coupled to one or more of the windings L1, L2, L3 and L4, which arrangement facilitates, in certain instances, the initial adjustment of the system so as to produce the normal balance voltage between the measuring terminals 40—42 and compensate for any unbalance which otherwise might be introduced into the network by the modulating circuit including winding L4. A variation in the value of the resistor R alters the voltages across the windings L2 and L3, the principal effect being in respect to the winding L3 in view of the more direct coupling between windings L5 and L3, thus enabling said voltages to be brought into balance. In view of the fact that a variation in value of the resistor R alters the voltage balance of the windings L2 and L3, it will be appreciated that the resistor R may be varied to introduce the modulation effect.

In the further modified embodiment of Fig. 4, the modulation of the winding L4 is produced by altering the tuned characteristics of an associated circuit comprising the transformer 68, the variable condenser C4, and an auxiliary condenser 66, it being appreciated that in this embodiment the primary modulator circuit, comprising the windings L2 and L3, is initially adjusted, so that at a normal value of the condenser C4, for example, a desired voltage balance is obtained across the terminals 40—42. Accordingly, any change in the value of condenser C4 produces a modulation of the winding L4, which modulation, in turn, is reflected as a change in voltage between the terminals 40—42.

It will be noticed that with the arrangements of Figs. 2, 3 and 4, the modulation can be introduced at a point which is remote from the principal modulator circuit, thus allowing the modulator circuit itself to be placed at a convenient point irrespective of the location of the particular machine element or other part, which is under investigation and near or on which the modulating changes must occur. A further advantage of the present system is that the connections between the modulator circuit and the source of modulating energy, such as 62 of Fig. 2, can be of relatively low impedance and consequently these remote connections can be substantially free of the difficulties, due to parasitic capacity, which usually accompany the use of remote connections.

In Fig. 4, also, the previously described primary winding L1 is replaced by two structurally independent windings L1' and L1", which are inductively coupled to the windings L2 and L3, respectively, and which may or may not be inductively coupled to each other. The windings L1' and L1" are connected to the source 20 through a potentiometer R1 and a condenser C5. The potentiometer R1, of course, adjusts the amplitudes of the voltages across windings L1' and L1", and, consequently, across the circuit portions including windings L2 and L3 and thus provides an efficient means of obtaining an initial amplitude balance.

Referring again generally to Fig. 1, when reactive element C2, 26, or L2, is caused to change in value, a change is introduced in this circuit which is transferred (or reflected) through the magnetic linkage between windings L2 and L1 to winding L1 and thence to winding L3. It appears that the "tuning," specifically, is changed only in the circuit in which a mechanically produced change of reactance is effected. The balance of the phenomena, i. e., the accompanying change in the companion circuit including elements L3, C3 and 28, is but a reflected voltage change. Although no change of "tuning" appears to be effected in the latter circuit, since its component values of inductance and capacity, etc. are not changed, the effect is the same as if they had been changed.

Also, in Figs. 2, 3 and 4, the only points at which actual change of tuning is accomplished are in the remote circuits including the winding C4, all other phenomena merely being a transference of this change by reason of the described arrangements of couplings and magnetic linkages.

In the embodiments of the invention thus far described, the change or modulation has been described as being measured directly between the terminals 40—42. It will be understood, however, that the voltage developed between the terminals 40—42 may instead be applied to suitable amplifying apparatus.

In the specific arrangement of Fig. 5, an amplifier tube 70 is utilized of a type that is commercially available, having either a single plate 72 or a pair of plates connected in parallel, a cathode 74, and a pair of control grids 76 and 78. A usual grid bias source 77 and a source 79 of plate voltage are provided. In this instance, the terminals of the circuit, including the winding L2, are connected respectively to the grid 76 and to the cathode 74, whereas the terminals of the circuit, including the winding L3, are connected, respectively, and in opposite relation, to the grid 78 and the cathode 74. As before, the circuits including the windings L2 and L3, which are, as before, adjustably coupled to the winding L1, are adjusted to desired points on the resonance curve, so that a modulation of the system, produced, for example, by adjusting the condenser C2 or C3, or both thereof, enables the two secondary circuits to alter the potential of the grids 76 and 78 relative to the filament 74, thus producing a change between the terminals 80—82, which are connected in the plate circuit of the valve 70, which is proportional to the original modulation and to the vectorial sum of the effects produced in the individual secondary circuits.

In the further modified embodiment of the invention shown in Fig. 6, two valves 84 and 86 are employed, valve 84 being associated with the secondary circuit, including the winding L2, and valve 86 being associated with the secondary circuit, including the winding L3. Modulations of the secondary circuits produced in the manner or manners aforesaid obviously modulate the current flows in the plate circuits of valves 84 and 86, which plate circuits are differentially connected together in series with the primary winding 88 of a transformer 90, the secondary winding 92 whereof is connected to the terminals 80—82 between which the modulation or change is reflected.

It will be understood that with the arrangements of Figs. 1, 2, 3, 4, 5 and 6, the voltage wave impressed between the output terminals has a frequency equal to that of the source of carrier energy and has an amplitude which is proportional to the modulating change. The voltage wave between the output terminals may, of course, be connected to suitable conventional demodulating elements, so as to deliver a terminal voltage of the amplitude, form and frequency of the modulating change, which latter wave may, if desired, be further amplified. A particular advantage of the present system is that the modulation effect may be amplified in carrier frequency stages, thus enabling the use of simple and reliable amplifiers.

It will be appreciated that the modulating changes may occur either relatively rapidly or relatively slowly, and, moreover, the system may be called upon to reflect a change which remains constant in magnitude for an appreciable period. The relatively slow changes and the just-mentioned steady state conditions would be virtually impossible to amplify with usual low frequency amplifiers. With the present system, however, in which the amplitude of the carrier frequency wave is directly proportional to the change, or is a controllable percentage of the amplitude of such carrier wave, the amplification may take place in the carrier frequency stages, and the above-mentioned very slow or steady state conditions can be amplified with the same accuracy as changes of higher frequency.

Fig. 8 illustrates the adaptability of the invention to those applications in which it is desired to produce a comparison between two more or less independent changes. Referring particularly to Fig. 8, a first modulator circuit 100 of the type described with reference to Fig. 2, for example, is provided with means 62' as a source of modulation energy and a companion modulator circuit 102 is provided with a second source of modulation energy 62". The output terminals 40 and 42 of the modulator units 100 and 102 are differentially connected to each other and to a suitable measuring or indicating device M. The modulator elements 62' and 62" are illustrated as comprising a master gear A and a second gear A', it being understood that the present system is herein illustrated as employed to compare the tooth forms or other physical characteristics of the two gears A and A'. The elements 104 and 106 are illustrative of profile tracing devices past which the gears A and A" are rotated in synchronism with each other, and each gear and its profile element may be suitably arranged to constitute the elements of a condenser so that the movement of each gear relative to its tracing element produces a change in the capacity therebetween. This change in capacity produces a modulation effect, as described with relation to Fig. 2, which is reflected as a change in voltage between the associated terminals 40 and 42. It will be understood that so long as the just-mentioned changes in voltages occur synchronously as to time and of equal magnitude, which condition would obtain, if the gear A' to be checked accurately duplicates master gear A, the resultant terminal voltages would counter-balance each other and no voltage would be applied to the terminals of the indicating element M. In the event of a discrepancy between the form of the gear A' and that of the master gear A, however, the magnitude of the voltage wave impressed across terminals 40—42, associated with the master gear A, would differ from the voltage wave impressed across the terminals 40—42, associated with the gear A', and a resultant voltage, proportional to the discrepancy, would be impressed across the indicating device M.

As is discussed in detail with reference to Figs. 1 through 6, the present modulator system may be caused to produce instantaneous voltages which are accurately proportional to external changes, which changes may take place either very slowly or very rapidly, and which changes may be very small in value. The latter property makes the system peculiarly adaptable to the production of current or voltage wave forms, which exactly correspond to a peculiar shape, volume, contour or movement of a related element or to a peculiar variation in temperature, pressure, or the like.

The accuracy of response of the present modulator system, together with its faculty of responding to changes which occur either rapidly or slowly, renders it valuable in the measurement and recording of torque and of torsional strains. Moreover, by metering the torque in operative relation to a measure of speed, continuous horsepower measurements are available.

In the broader aspects of the invention, various well known elements may be used to cause a torsional strain or displacement to produce either an inductive or a capacitive change.

Although only several specific embodiments of the present modulator circuit have been disclosed, it will be appreciated that various further modifications in the form and arrangement of these circuits may be made within the spirit and scope of the invention. It will also be appreciated that, the present modulator circuits can, in a generic sense, be used with any type of pickup unit adapted to produce an inductive, capacitive, or resistive change in response to the physical condition being studied. Further, while several specific and preferred applications of the present modulator circuits have been described in considerable detail, it will be recognized that many other applications of these circuits are possible and the disclosure of these preferred applications is, therefore, to be considered in an illustrative and not in a limiting sense.

What is claimed is:

1. In a system for comparing the shapes of different objects, the combination of first and second modulating circuits differentially connected to each other and to a translating device so that the voltage impressed across said translating device is proportional to the vectorial sum of the voltages of said modulating circuits, a phase reactive element for modulating the voltage of one of said circuits, means for varying said first reactive element in accordance with the shape of one object, a second reactive element for modulating the voltage of the other circuit and means for varying said second reactive element in accordance with the shape of the other object.

2. In combination, an electrical network including a source of alternating current energy, an output circuit connected to said source to have a voltage impressed thereacross by said source, said circuit having first and second portions each including impedance means and connected so that the voltage across the terminals of said circuit is proportional to the vectorial sum of the voltages across said portions, said portions being tuned to predetermined points differing substantially from resonance so as to produce a predetermined normal said vectorial sum, a modulating element remote from said net work, coupling means including a transmission line of relatively low impedance and at least one transformer between said element and said network, said element being variable so as to vary the tuning of said network and alter said vectorial sum, and additional tuning means coupled to said network and adjustable to compensate for any unbalance from said predetermined tuned relation.

3. A system for measuring mechanical motions which comprises a source of alternating current energy of a given frequency, a pair of tuned circuits each resonant at a frequency close to but differing from said given frequency, indicator means for giving an indication responsive to alternating current energy, means connecting said source and said indicator means to said pair of tuned circuits in differential network fashion whereby the magnitude of the alternating current transfer from said source to said indicator means is approximately proportionate to the divergence of the vectorial impedances of said pair of tuned circuits from a predetermined proportionality, an impedance element remote from said pair of tuned circuits, a transmission line of relatively low impedance extending from said remote element to one of said tuned circuits and having a surge impedance substantially different from the normal impedance of said remote element at said frequency, first transformer means coupling said remote element to said line, further transformer means coupling said line to said one of said circuits, and means for varying the impedance of said remote element responsive to said motion to be measured whereby the effective impedance of said one of said circuits is altered to cause a variation in the indication of said indicator means.

4. A system according to claim 3 wherein said remote element comprises an inductive reactance and a capacitative reactance proportioned to resonate at a frequency close to said given frequency and wherein said means for varying said remote element responsive to said motion comprises means for varying only one of said reactances, thereby changing the combined impedance of said two reactances by a substantially greater percentage.

5. A system according to claim 3 further comprising an auxiliary winding inductively coupled to one of said pair of tuned circuits and a variable resistor connected in series therewith for adjusting the effective phase angle of the corresponding tuned circuit.

6. An electrical system for ascertaining a physical condition of an instrumentality comprising, a source of alternating current energy of a frequency above the audio range; a pair of circuits; indicator means; means coupling the source and indicator means to said pair of circuits in differential network fashion whereby the magnitude of the energy transfer from said source to said indicator means is approximately proportional to the divergence of the vectorial impedances of said circuits from a predetermined proportionality; at least one of said circuits comprising elements having at said frequency a relatively high ratio of reactance to resistance, impedance means the value of which is controlled by and in accordance with the condition to be ascertained, a transmission line having at said frequency an impedance which is low in comparison to the impedance of said elements, and means coupling said elements to said impedance means through said line; the said circuit comprising said elements, impedance means, line and coupling means being tuned to the neighborhood of resonance to said frequency.

7. A system according to claim 6 wherein at least certain of said last-mentioned coupling means are inductive.

8. A system according to claim 6 wherein said impedance means comprises elements having at said frequency a high ratio of reactance to resistance.

9. An electrical system for ascertaining a physical condition of an instrumentality comprising, a source of alternating current energy of a frequency above the audio range; indicator means, means coupling the indicator means to receive alternating current energy from said source comprising a bridge circuit having a pair of reactive arms, said coupling being such that the magnitude of the energy transfer from said source to said indicator means is approximately proportional to the divergence of the vectorial impedances of said arms from a predetermined proportionality; at least one of said arms comprising elements having at said frequency a relatively high ratio of reactance to resistance, impedance means the value of which is controlled by and in accordance with the condition to be ascertained, a transmission line having at said frequency an impedance which is low in comparison to the impedance of said elements, and means coupling said elements to said impedance means through said line; the said arm being tuned to the neighborhood of resonance to said frequency.

10. A system according to claim 9 wherein at least certain of said last-mentioned coupling means are inductive.

11. A system according to claim 9 wherein said impedance means comprises elements having at said frequency a high ratio of reactance to resistance.

CLARE M. RIFENBERGH.

REFERENCES CITED

The following references are of record in the file of this patent:

UNITED STATES PATENTS

| Number | Name | Date |
|---|---|---|
| 1,379,526 | Childs | May 24, 1921 |
| 1,606,807 | Riegger | Nov. 16, 1926 |
| 1,703,171 | Purvington | Feb. 26, 1929 |
| 1,817,294 | Cutting et al. | Aug. 4, 1931 |
| 1,842,968 | Horvath | Jan. 26, 1932 |
| 1,938,349 | Norton | Dec. 5, 1933 |
| 1,946,099 | Norton | Feb. 6, 1934 |
| 1,951,276 | Edwards et al. | Mar. 13, 1934 |
| 1,961,783 | Roder | June 5, 1934 |
| 1,986,406 | Norton | Jan. 1, 1935 |
| 2,007,505 | Smith | July 9, 1935 |
| 2,036,833 | Schmidt | Apr. 7, 1936 |
| 2,060,898 | Rosene | Nov. 17, 1936 |
| 2,087,950 | Ho'den | July 27, 1937 |
| 2,097,226 | Miyazaki | Oct. 26, 1937 |
| 2,116,833 | Wilfort | July 18, 1939 |
| 2,200,863 | Schuck | May 14, 1940 |
| 2,208,648 | Schrader | July 23, 1940 |
| 2,214,608 | Bull | Sept. 10, 1940 |
| 2,217,539 | DeBruin | Oct. 8, 1940 |
| 2,219,939 | Rich | Oct. 29, 1940 |
| 2,234,461 | Jubbs | Mar. 11, 1941 |
| 2,245,700 | Mounce | June 17, 1941 |

FOREIGN PATENTS

| Number | Country | Date |
|---|---|---|
| 322,357 | Germany | June 28, 1920 |